(12) United States Patent
Zamanzad Gavidel et al.

(10) Patent No.: US 11,227,234 B2
(45) Date of Patent: Jan. 18, 2022

(54) NORMALIZED PERFORMANCE COMPARISON TECHNIQUES

(71) Applicant: Traxen Inc., Plymouth, MI (US)

(72) Inventors: Saeed Zamanzad Gavidel, Plymouth, MI (US); Gerti Tuzi, Plymouth, MI (US); Syed Ali, Plymouth, MI (US); Ali Maleki, Canton, MI (US)

(73) Assignee: Traxen Inc., Plymouth, MI (US)

( * ) Notice: Subject to any disclaimer, the term of this patent is extended or adjusted under 35 U.S.C. 154(b) by 147 days.

(21) Appl. No.: 16/438,223

(22) Filed: Jun. 11, 2019

(65) Prior Publication Data
US 2019/0378039 A1 Dec. 12, 2019

Related U.S. Application Data

(63) Continuation of application No. 16/355,641, filed on Mar. 15, 2019, now Pat. No. 11,072,329, and a continuation of application No. 16/355,657, filed on Mar. 15, 2019, now Pat. No. 11,107,002, and a continuation of application No. 16/289,635, filed on Feb. 28, 2019, now abandoned, and a continuation of application No. 16/289,638, filed on Feb. 28, 2019, now abandoned, and a continuation of application No. 16/212,108, filed on Dec. 6, 2018.

(60) Provisional application No. 62/683,188, filed on Jun. 11, 2018.

(51) Int. Cl.
*G06N 20/00* (2019.01)
*B60W 50/00* (2006.01)
*B60W 30/14* (2006.01)
*G06N 7/00* (2006.01)
*G06N 3/00* (2006.01)

(52) U.S. Cl.
CPC ............ *G06N 20/00* (2019.01); *B60W 30/14* (2013.01); *B60W 50/0097* (2013.01); *B60W 2050/0013* (2013.01); *B60W 2400/00* (2013.01)

(58) Field of Classification Search
USPC ...................................................... 701/98
See application file for complete search history.

(56) References Cited

U.S. PATENT DOCUMENTS

| | | | |
|---|---|---|---|
| 9,020,726 B2 | 4/2015 | Boeckenhoff et al. | |
| 9,818,240 B1 * | 11/2017 | Brenner | G07C 5/008 |
| 2013/0254156 A1 * | 9/2013 | Abbasi | G06F 16/215 707/602 |
| 2017/0372534 A1 * | 12/2017 | Steketee | G07C 5/008 |
| 2018/0072157 A1 | 3/2018 | Koebler et al. | |
| 2019/0378039 A1 * | 12/2019 | Zamanzad Gavidel | G06N 7/005 |
| 2019/0378040 A1 * | 12/2019 | Ali | G06N 7/005 |

(Continued)

FOREIGN PATENT DOCUMENTS

DE 102016214045 2/2018

*Primary Examiner* — Tyler D Paige (57) ABSTRACT

A normalized driver performance comparison framework can include predicting a plurality of scenarios of a ground vehicle. A Monte Carlo simulation can be utilized to determine results using the predicted plurality of scenarios and one or more predictive models. Best and worst possible scenarios and associated efficiency for an observed scenario can be determined based on the Monte Carlo simulation results. The efficiency for the observed scenario can be normalized as a function of the best and worst efficiencies.

25 Claims, 8 Drawing Sheets

(56) References Cited

U.S. PATENT DOCUMENTS

2019/0378041 A1\* 12/2019 Dhansri ................. G06N 20/00
2019/0378042 A1\* 12/2019 Tuzi ..................... B60W 30/14

\* cited by examiner

NORMALIZED PERFORMANCE COMPARISON TECHNIQUES

CROSS-REFERENCE TO RELATED APPLICATIONS

This is a Continuation of U.S. patent application Ser. No. 16/355,657, filed Mar. 15, 2019, a Continuation of U.S. patent application Ser. No. 16/355,641, filed Mar. 15, 2019, a Continuation of U.S. patent application Ser. No. 16/289,638 filed Feb. 28, 2019, a Continuation of U.S. patent application Ser. No. 16/289,635 filed Feb. 28, 2019, a Continuation of U.S. patent application Ser. No. 16/212,108 filed Dec. 6, 2018, and claims the benefit of U.S. Provisional Patent Application No. 62/683,188 filed Jun. 11, 2018, all of which are incorporated herein by reference in their entirety. This application also claims the benefit of co-filed U.S. application Ser. No. 16/438,319, filed Jun. 11, 2019, entitled "Predictive Control Techniques for Ground Vehicles", co-filed U.S. application Ser. No. 16/438,337, filed Jun. 11, 2019, entitled "Pre-Training of a Reinforcement Learning Ground Vehicle Controller Using Monte Carlo Simulation", co-filed U.S. application Ser. No. 16/438,305, filed Jun. 11, 2019, entitled "User Vehicle Operation Interface Systems and Methods", and co-filed PCT Application No. PCT/US19/36634, filed Jun. 11, 2019, entitled "Automated Cruise Control System to Automatically Decrease an Overall Ground Vehicle Energy Consumption", all of which are incorporated herein by reference in their entirety.

BACKGROUND OF THE INVENTION

The operating costs of commercial vehicles include fuel, labor, equipment, insurance and the like. The fuel costs are the largest portion of the operating costs. The profit margin across the commercial truck industry is currently approximately 4.8%. Therefore, if operating costs, through fuel savings, can be reduced by just 5%, the net operating profit margins for a trucking company can be increased by 50%.

Generally, optimal energy efficiency can be obtained while cruising at a steady speed, at minimal throttle and with the transmission in the highest gear on a level roadway. However, the driving environment is highly dynamic and therefore ground vehicles cannot be operated at a steady slate cruising speed, with minimal throttle input in the highest gear. Hills, curves, traffic, weather and the like will require the vehicle to operate at varying speeds, accelerating and braking, and changing between multiple gears. The driving environment and the skill of the given driver can have a significant impact on energy efficiency. The efficiency of the ground vehicle also varies between types of vehicles and applications. For example, some trucks are configured for local deliveries where stop and go style driving is common, loads may be lighter, the average speeds are lower, there are more braking events, and there is more idling time during multiple delivery stops. Other trucks are configured for heavy loads, traveling predominantly on highways, across mountain passes, and at higher average speeds. The efficiency also varies not just between make and model of ground vehicles, but also between vehicles of the same make, model, year and configurations. Each vehicle of the same make, model, year and configuration can exhibit slightly different performance due to manufacturing variations. Finally, efficiency will vary for different routes between the same two points, or for the same route under different weather and or traffic conditions.

Because ground vehicles like commercial trucks are typically operated for long periods of time, day in and day out, and traveling substantial distance, even small differences in efficiency can have an appreciable impact on operating costs. However, with all the impacts on efficiency it is difficult to accurately determine small differences in efficiency between ground vehicles and or drivers. Therefore, there is a need to accurately determine the efficiency of ground vehicles.

SUMMARY OF THE INVENTION

The present technology may best be understood by referring to the following description and accompanying drawings that are used to illustrate embodiments of the present technology directed toward normalized performance comparison.

In one embodiment, system for normalized performance comparison of aspects of performance of a ground vehicle or driver can include a predictive analytics unit, a Monte Carlo simulation unit and an events reconstruction, optimization and ranking unit. The predictive analytics unit can be configured to predict a plurality of scenarios based on a constructed parametric model and or a non-parametric model. The Monte Carlo simulation unit can be configured to perform statistical Monte Carlo simulations using the predicted plurality of scenarios and the one or more predictive models. The events reconstruction, optimization and ranking unit can be configured to reconstruct driving events, evaluate driving scenarios, and determine a best/near best driving scenario and or worst/near worst driving scenario. The best/near best and or worst/near worst driving scenarios can be utilized to score or categorize the performance of a ground vehicle and or the drive. The best near best and or worst/near worst driving scenarios can be utilized to determine driving rules for use in training drivers and or modifying inputs to the ground vehicle from drivers.

In another embodiment, a method of comparing performance of one or more aspects of ground vehicle operation can include constructing one or more predictive models of ground vehicle operation. A plurality of scenarios of the ground vehicle operation can be predicted. Monte Carlo simulation results can be determined using the predicted plurality of scenarios and the one or more predictive models. An observed scenario and associated observed efficiency of the ground vehicle operation can be received. A best possible scenario and associated best efficiency that could have happened can be determined for the observed scenario based on the Monte Carlo simulation results. A worst possible scenario and associated worst efficiency that could have happened can also be determined for the observed scenario based on the Monte Carlo simulation results. The observed efficiency can be normalized as a function of the best efficiency and the worst efficiency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the an to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

As used herein, a ground vehicle includes a motorized vehicle with wheels that maneuvers along roadways. For example, ground vehicles can include, but are not limited to, semi-trucks, tractor-trailers, trucks, busses, motorhomes, automobiles, cars, motor cycles, recreational vehicles (RVs), all-terrain vehicles (ATVs), utility vehicles (UTVs), tractors and the like. As used herein, the term energy can include, but is not limited to, gasoline, diesel, propane, natural gas, ethanol, alcohol, electricity, solar, battery, hydrogen, and the like. As used herein, engines can include, but are not limited to, internal combustion engines, electric motors, and the like. As used herein, the term powertrain includes the mechanisms by which power is generated and transmitted to the roadway by the ground vehicle. As used herein, the term performance can include, but is not limited to, energy consumption, braking, shifting, travel time, travel distance, and or the like.

Figure 1:
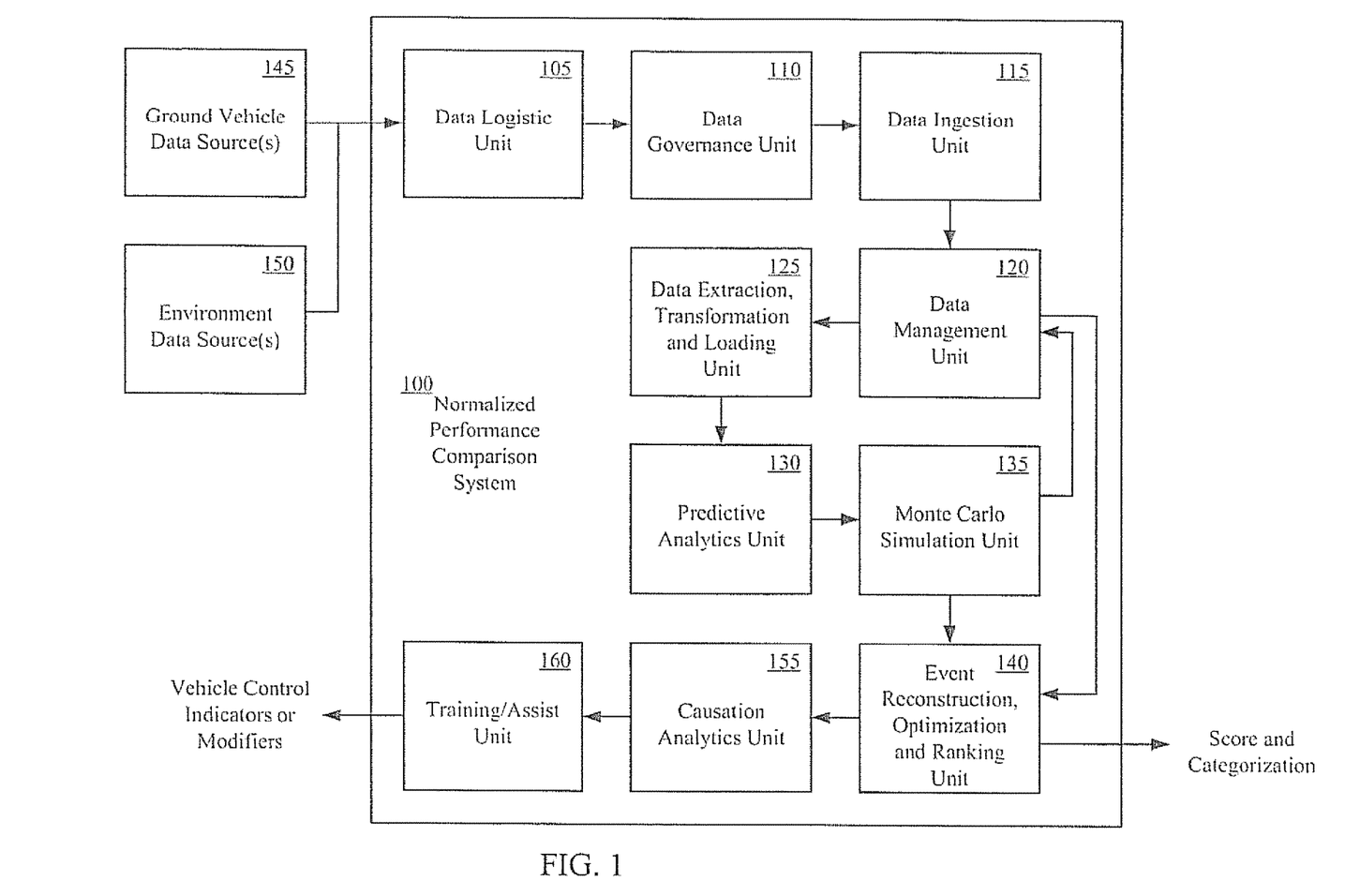
FIG. 1 shows a normalized performance comparison system, in accordance with aspects of the present technology.

Referring to FIG. 1, a normalized performance comparison system, in accordance with aspects of the present technology, is shown. The normalized performance comparison system can be utilized to compare drivers, routes, vehicle fuel efficiency, safety and or other similar ground vehicle or driver metric in a normalized manner. For convenience, aspects of the present technology will be described with reference to ruel efficiency. However, the present technology can be applied to normalized performance comparison of any other driver and/or ground vehicle metric. The normalized performance comparison system 100 can be configured to construct one or more predictive models of the operation of a ground vehicle. The normalized performance comparison system 100 can be configured to predict a plurality of scenarios of the ground vehicle operation and determine Monte Carlo simulation results using the predicted plurality of scenarios and the one or more predictive models. The normalized performance comparison system 100 can also be configured to receive an observed scenario and one or more of observed energy efficiency parameters of the ground vehicle operation. The normalized performance comparison system 100 can be configured to determine a best and worst possible scenario and associated best and worst energy efficiency parameters that could have happened for the observed scenario based on the Monte Carlo simulation results, and normalize the observed energy efficiency parameters.

The normalized performance comparison system 100 can include a data logistic unit 105, a data governance unit 110, a data ingestion unit 115, a data management unit 120, a data extraction, transformation and loading unit 125, a predictive analytic unit 130, a Monte Carlo simulation unit 135, and an event reconstruction, optimization and ranking unit 140. The data logistic unit 105 can be configured to received data from one or more data sources, including but not limited to ground vehicle data sources 145 and or environment data sources 150. The data logistic unit 105 can be configured to expand and contract in response to one or more of an analytical scenario and a computational workload.

The ground vehicle data sources 145 can include, but are not limited to, engine sensors, throttle position sensors, fuel injector sensors, intake sensors, mass airflow sensors, oxygen sensors, exhaust sensors, engine tachometers, voltmeters, current meters, temperature sensors, fluid level sensors, and the like of the ground vehicle. The ground vehicle data sources 145 can also include data describing the driver, the make and model of the ground vehicle, and the like. The environment data sources 150 can include, but are not limited to, cameras, radar, inertial measurement units (IMU), global position systems (GPS), light detection and ranging (LIDAR), temperature sensors, dedicated short range communications (DSRC), and the like that generally characterize the driving environment in which the ground vehicle is operating. The data can include road data including, but not limited to, map data, road grade, road surface type and or quality, road curvature, speed limit, and road construction data. The data can also include ambient temperature, road surface temperature, visibility condition, precipitation condition, wind speed and direction, and wind gust data. The data can also include road traffic conditions, such as changes in speed limits, lead vehicle distance, speed, acceleration and the like. The data can also be collected from other sources such as map applications, weather forecasting stations, websites and the like via one or more networks, such as cellular telephone, Bluetooth, WiFi, satellite networks and the like. Accordingly, the data logistics unit 105 can be configured communicate with a plurality of data systems and to support a plurality of different data types and structures. The data logistic unit 105 can be configured to cleanse the data, unify the data from different runs and or different data sources, convert the data to a desired structured or unstructured type and or compress the data.

Figure 2:
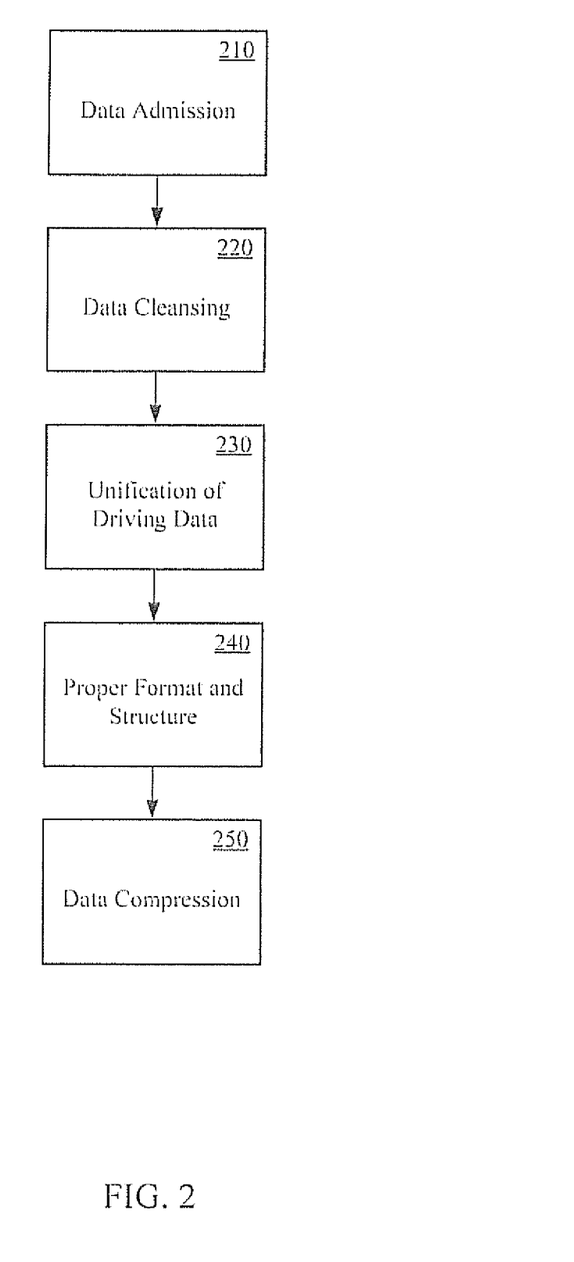
FIG. 2 shows functions of the data logistic unit, in accordance with aspects of the present technology.

Referring now to FIG. 2, functions of the data logistic unit, in accordance with aspects of the present technology, is shown. The data logistic unit can admit 210 driving data in common formats, such as *.txt and *.csv from different data sources. Upon admission, the data can be cleansed 220 to improve data quality. The data can be cleansed by cleansing undesirable special characters that carry high computational burdens to the computational platforms such as distributed clusters. The cleansed data can be unified 230. In one implementation, a data unification algorithm in a Python/Apache Spark environment can be applied to unify the driving data from different data runs and or sources. The unified data can also be formatted and or structured 240. In one implementation, integrated data can be converted to proper columnar data structures like parquet or optimal row columnar (ORC). The formatted data can then be compressed 250. In one implementation, a data compression algorithm like grip or snappy can be applied to compress data and improve the data storage efficiency. Using a proper data compression algorithm can reduce the data storage costs by approximately 70% or more.

Referring again to FIG. 1, the data governance unit 110 can be configured to determine if the data received from the one or more data sources 145, 150 conforms with one or more regulations before ingestion by the data ingestion unit 115. For example, the data governance unit can be utilized to determine if the data meets one or more government regulations, industry regulations, standards or norms, and or organization regulations, standards or norms.

The data ingestion unit 115 can be configured to ingest the data received by the data logistic unit and prepare the data for further analysis. The data ingestion unit 115 can also be configured to expand and contract in response to different workloads. The data ingestion unit 115 can be configured to be elastic such that different workloads can be efficiently handled. The data ingestion unit 115 can also be configured to tolerate unexpected faults. The data ingestion unit 115 in one implementation can utilize Hadoop distributed file system (HOPS) complemented by Spark directed acyclic graph (DAG) technologies to provide fault tolerance. The data ingestion unit 115 can be configured to have one or more atomicity, consistency, isolation and durability properties. The data ingestion unit 115 can be configured to provide an interface for transferring the data between data structures and formats. The data ingestion unit 115 can utilize Apache Sqoop or the like to enable compatibility with various legacy applications. Accordingly, the data ingestion unit 115 can be responsible for obtaining and importing data for immediate storage in one or more databases, data repositories, or the like. The data ingestion unit 115 can be configured as a cluster-computing framework for a parallelization and distributed compulation implementation. The parallelization/distribution framework can be implemented utilizing Apache Spark, Python Dask, Python Numba, gpuR or the like.

The data management unit 120 can be configured to store, manage, query, and retrieve that data from the data ingestion unit 115, the extraction, transformation and loading unit 125, the Monte Carlo simulation unit 135, and the events reconstruction, optimization and ranking unit 140. The data management unit can store, manage, query, and retrieve data for analytical purposes such as constructing predictive models. The data management unit 120 can be configured to receive queries and remaining data, metadata, or file pointers to one or more file-residing directories. The major functionality of the data management unit can be to store data, query and retrieve ground vehicle operating and corresponding environment data in a computationally economic manner. In one implementation, a hyper algorithm can be constructed on top of a data reservoir, such as a farm of parquet files. The hyper algorithm can be responsible for interacting with data extraction, transformation and loading algorithms to admit queries and return appropriate life pointers. The pointers can direct the data extraction, trans formation and loading algorithms to the right directory of the parquet files. The hyper algorithm can also provide meta data and meta information related to the driving flies and processes. The hyper algorithm can provide meta data including information such as file size, number of signals received front vehicle sensors and or the like. In one example, an anonymized implementation of the hyper algorithm is illustrated in Table 1.

TABLE 1

| file_name | fleet_name | driver_name | vehicle_id | size_csv_MB |
|---|---|---|---|---|
| fleetname1_drivername1_vin1_2019-01-04 06:53:22 | fleetname1 | drivername1 | vin1 | 14.0 |
| fleetname1_drivername1_vin1_2019-01-04 07:12:53 | fleetname1 | drivername1 | vin1 | 15.0 |
| fleetname1_drivername1_vin1_2019-08-08 08:10:20 | fleetname1 | drivername1 | vin1 | 15.0 |

TABLE 1-continued

| | | | | |
|---|---|---|---|---|
| fleetname1_drivername1_vin1_2019-08-08 08:29:58 | fleetname1 | drivername1 | vin1 | 14.0 |
| fleetname2_drivername2_vin2_2019-01-04 08:10:20 | fleetname2 | drivername2 | vin2 | 15.0 |
| fleetname2_drivername2_vin2_2019-01-04 08:29:58 | fleetname2 | drivername2 | vin2 | 14.0 |
| fleetname2_drivername2_vin2_2019-01-08 08:10:20 | fleetname2 | drivername2 | vin2 | 15.0 |
| fleetname2_drivername2_vin2_2019-01-08 08:29:58 | fleetname2 | drivername2 | vin2 | 14.0 |

| file_name | size_parquet_MB | mw_nmb | signal_umb |
|---|---|---|---|
| fleetname1_drivername1_vin1_2019-01-04 06:53:22 | 4.0 | 11711 | 248 |
| fleetname1_drivername1_vin1_2019-01-04 07:12:53 | 4.0 | 11785 | 268 |
| fleetname1_drivername1_vin1_2019-08-08 08:10:20 | 4.0 | 11779 | 276 |
| fleetname1_drivername1_vin1_2019-08-08 08:29:58 | 3.0 | 11639 | 248 |
| fleetname2_drivername2_vin2_2019-01-04 08:10:20 | 4.0 | 11779 | 276 |
| fleetname2_drivername2_vin2_2019-01-04 08:29:58 | 3.0 | 11639 | 248 |
| fleetname2_drivername2_vin2_2019-01-08 08:10:20 | 4.0 | 11779 | 276 |
| fleetname2_drivername2_vin2_2019-01-08 08:29:58 | 3.0 | 11639 | 248 |

Major characteristics like Vehicle Identification Number (VIN) and data acquisition timestamps can be utilized to index driving data. The data management unit 120 can be designed to be horizontally and vertically scalable such that upon adding worker and master nodes, the system can horizontally expand. Such a scaling process can be economically cost efficient. The output of the hyper algorithm can be a Relational Database Management System (RDBMS) developed utilizing tools such as MySQL or Apache Hive. Using this composite data management system, millions to billions of process files can be seamlessly stored, managed, queried and mined at low latency and low computational costs. Millions to billions of compressed parquet files can be translated to tera bytes to peta bytes of driving data.

The data extraction, transformation and loading unit 125 can be configured to extract and mine the data from the data management unit and transform the data to a data formal appropriate for the predictive analytics unit 130. The data extraction, transformation and loading unit 125 can be configured to be fault tolerant. The data extraction, transformation and loading unit 125 can be configured to be compatible with a plurality of development environments. The data extraction, transformation and loading unit 125 can be configured to be elastic. The data extraction, transformation and loading unit 125 can be configured to support a plurality of application programming interfaces (APIs), from low level APIs for Spark Datasets and Hadoop map reduce operations to Spark high-level DataFrames. The data extraction, transformation and loading unit 125 can be configured to support a plurality of data management solutions. The data management solutions can include Apache Spark which is capable of efficiently mining the relational or non-relational data repositories, SQL and NoSQL databases. The data extraction, transformation and loading unit 125 can be configured to provide end-to-end data pipelining. In one implementation, Apache Spark can ensure compatibility of data query and data mining algorithms with machine learning algorithms if Spark MLLib framework is used to develop predictive models. The data extraction, transformation and loading unit 125 can be configured to provide data serialization. In one implementation, the extraction, transformation and loading algorithm can be capable of serializing the extracted data, a property that is significant for algorithm and cluster communication purposes.

The predictive analytics unit 130 can be configured to predict a plurality of scenarios based on a construct parametric or non-parametric model. The predictive analytics unit 130 can be used to predict un-seen scenarios based on the constructed predictive models for event reconstruction purposes. In one implementation, the predictive analytics units 130 can provide a confidence interval analysis along with an energy efficiency prediction.

Figure 3:
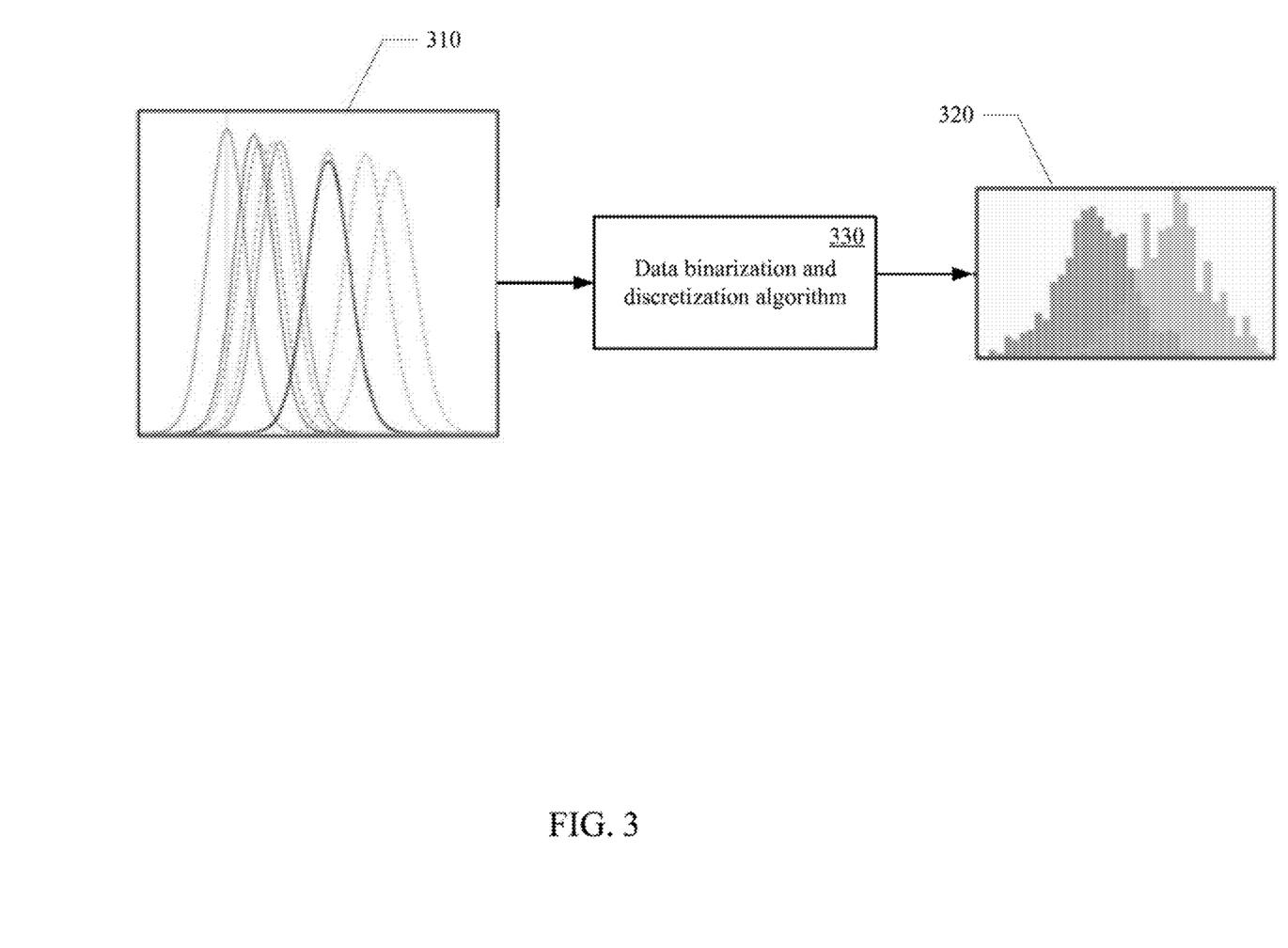
FIG. 3 shows an exemplary data binarization and discretization algorithm, in accordance with aspects of the present technology.

The predictive analytics unit 130 can be further configured to binarize and discretize continuous input data, construct one or more predictive models, and analyze the robustness of the plurality of predictive models for accuracy and variability. Referring now to FIG. 3, an exemplary data binarization and discretization algorithm, in accordance with aspects of the present technology, is illustrated. The data received from various data sources 145, 150 can be continuous and or decimal data. The continuous and or decimal data 310 can be converted into discrete binary data 320 by the binarization and discretization algorithm 330. For example, engine temperatures of 202 and 213, received from a temperature sensor, can be discretized as 200 and 210 respectively. The values can also be binarized by converting the decimal numbers to binary numbers. The binarization and discretization advantageously controls the computational workload of the Monte Carlo simulation of the driving scenarios. The binarization and discretization algorithm has a significant impact on the granutarization of the analytics result.

Figure 4:
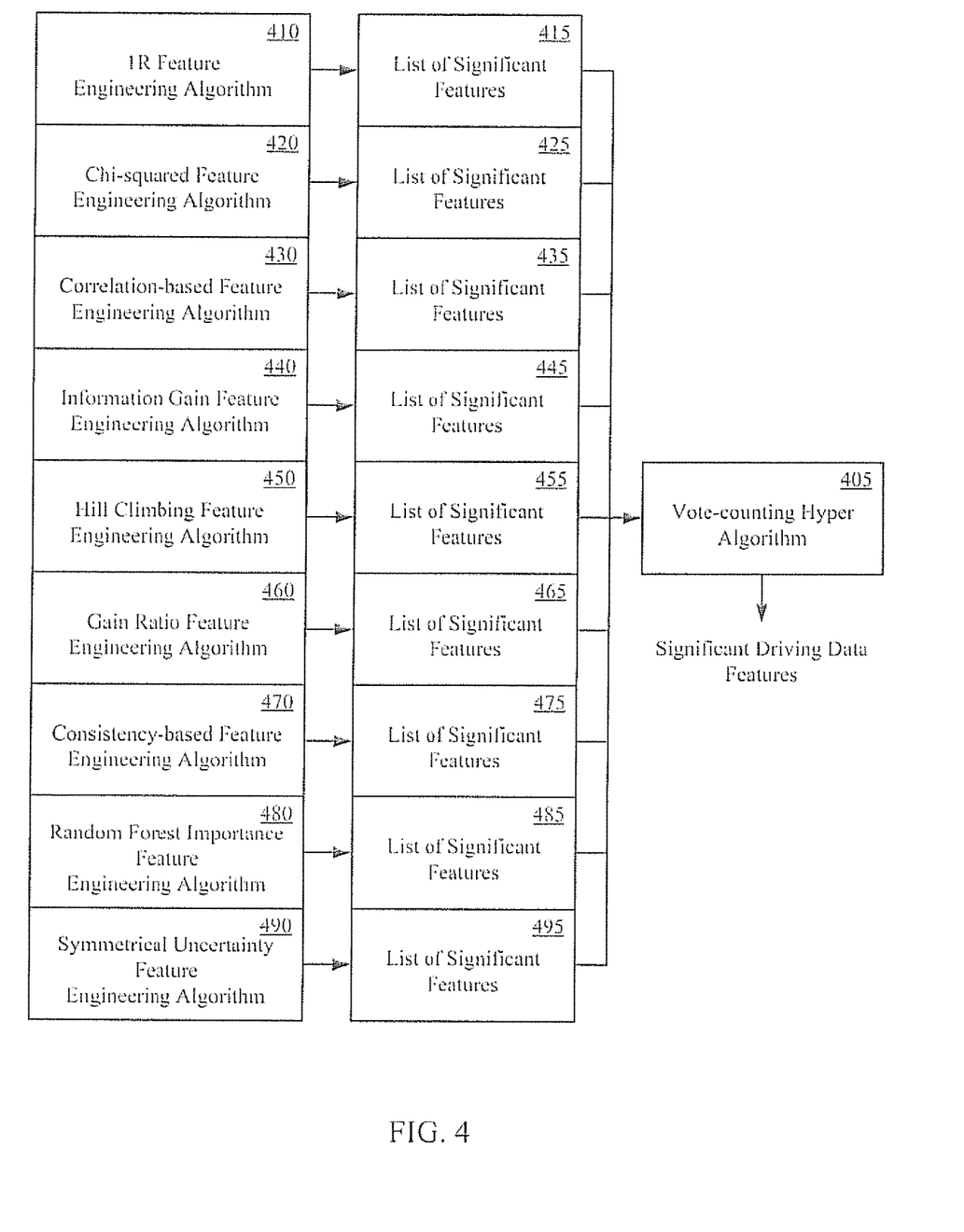
FIG. 4 shows an exemplary feature engineering and dimensionality reduction function, in accordance with aspects of the present technology.

The significant features can be selected utilizing one or more feature selection algorithms, a dimensionality reduction algorithm, and a vote-counting algorithm. In one implementation, a subset of significant driving features can be selected from the set of available features. However, different feature selection techniques generally return different subset of significant features. To resolve this issue and have a consistent subset of significant features, a vote-based feature selection algorithm can be utilized. Referring now to FIG. 4, an exemplary feature engineering and dimensionality reduction function, in accordance with aspects of the present technology, is illustrated. A plurality of feature selection algorithms can be deployed. For example, a 1R feature engineering algorithm 410 can generate a corresponding list of significant features 415, a chi-squared feature engineering algorithm 420 can generate a corresponding list of significant features 425, a correlation-based feature engineering algorithm 430 can generate a corresponding list of significant features 435, an information gain feature engineering algorithm 440 can generate a corresponding list of significant features 445, a hill climbing feature engineering algorithm 450 can generate a corresponding list of significant features 455, a gain ratio feature engineering algorithm 460 can generate a corresponding list of significant features 465, a consistency-based feature engineering algorithm 470 can generate a corresponding list of significant features 475, a random forest importance feature engineering algorithm 480 can generate a corresponding list of significant features 485, and a symmetrical uncertainty feature engineering algorithm 490 can generate a corresponding list of significant features 495. For dimensionality reduction purposes, principal component analysis (PCA) is the major candidate. Each individual feature engineering algorithm can be applied to the driving data. The hyper vote-counting algorithm 405 can be applied to enumerate the votes and return the most significant process features.

To construct one or more predictive models, the driving data can be split into training, validation and testing datasets. Depending on the availability of driving data and operational requirements, the following strategies having been utilized to split data: 1) 50%+25%+25%, 2) k-fold cross-validation, 3) 50-50 swapping, 4) bootstrapping, 5) one-out n-fold cross validation, 6) back-bundling, and or the like. To combat overfitting, grid search or drop-out algorithms can be utilized to tune the hyper parameters of the predictive models. To evaluate prediction performance of the predictive algorithms, a Mean Absolute Error (MAE) metric in accordance with Equation 1 can be utilized:

$$MAE = \frac{1}{n}\sum_{i=1}^{n}|y_i - \hat{M}(X_i)| \quad (1)$$

where n is the number of instances, $X_i$ represent input factor, $y_i$ is the observed continuous response, and $\hat{M}(X_i)$ is the predicted response estimated by the prediction model like M. To have deeper insights regarding the prediction performance of the predictive models, a ZeroR algorithm can be used to baseline the comparisons.

Figure 5A:
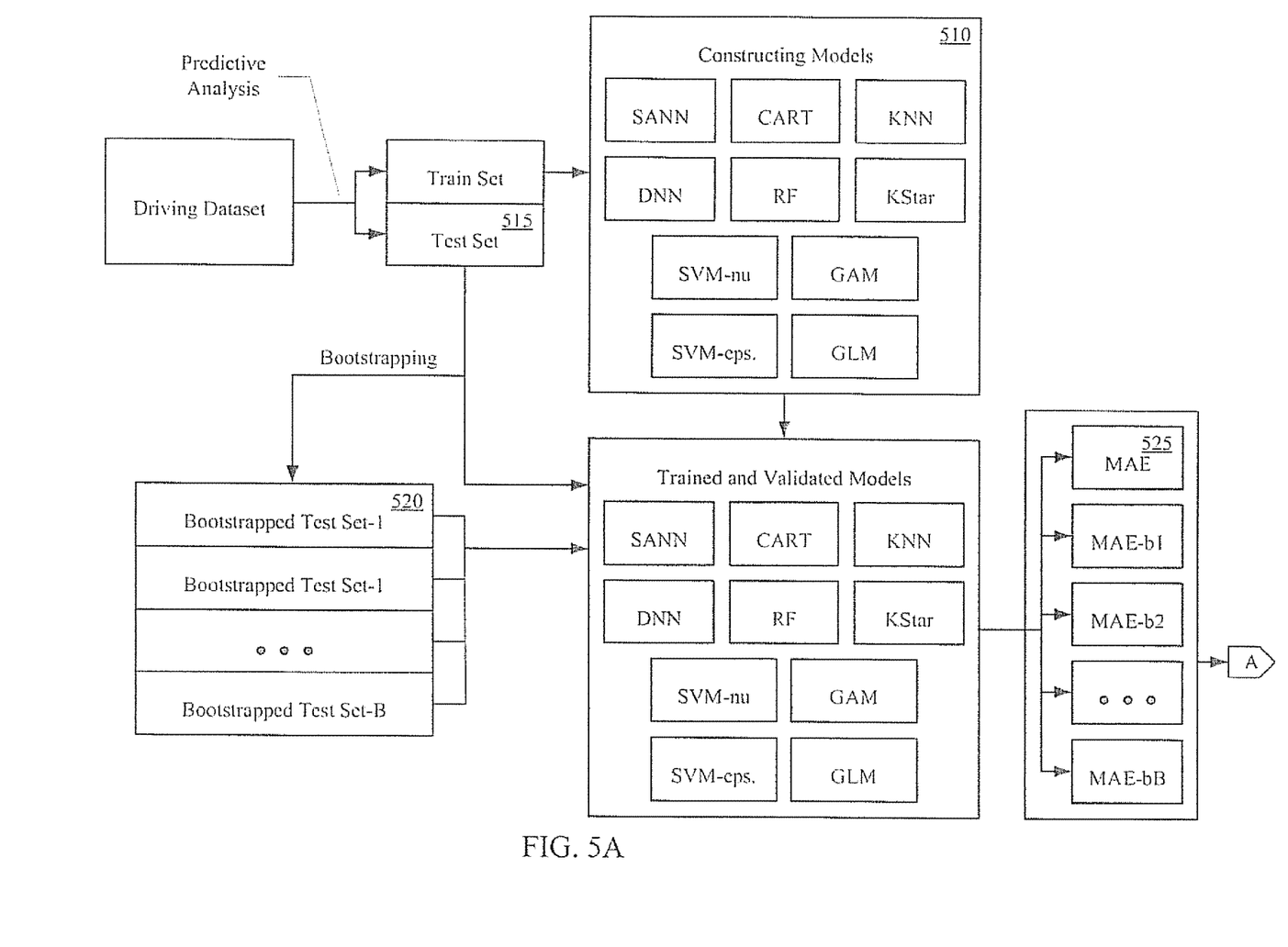
FIGS. 5A and 5B show a prediction robustness analysis algorithm, in accordance with aspects of the present technology.
Figure 5B:
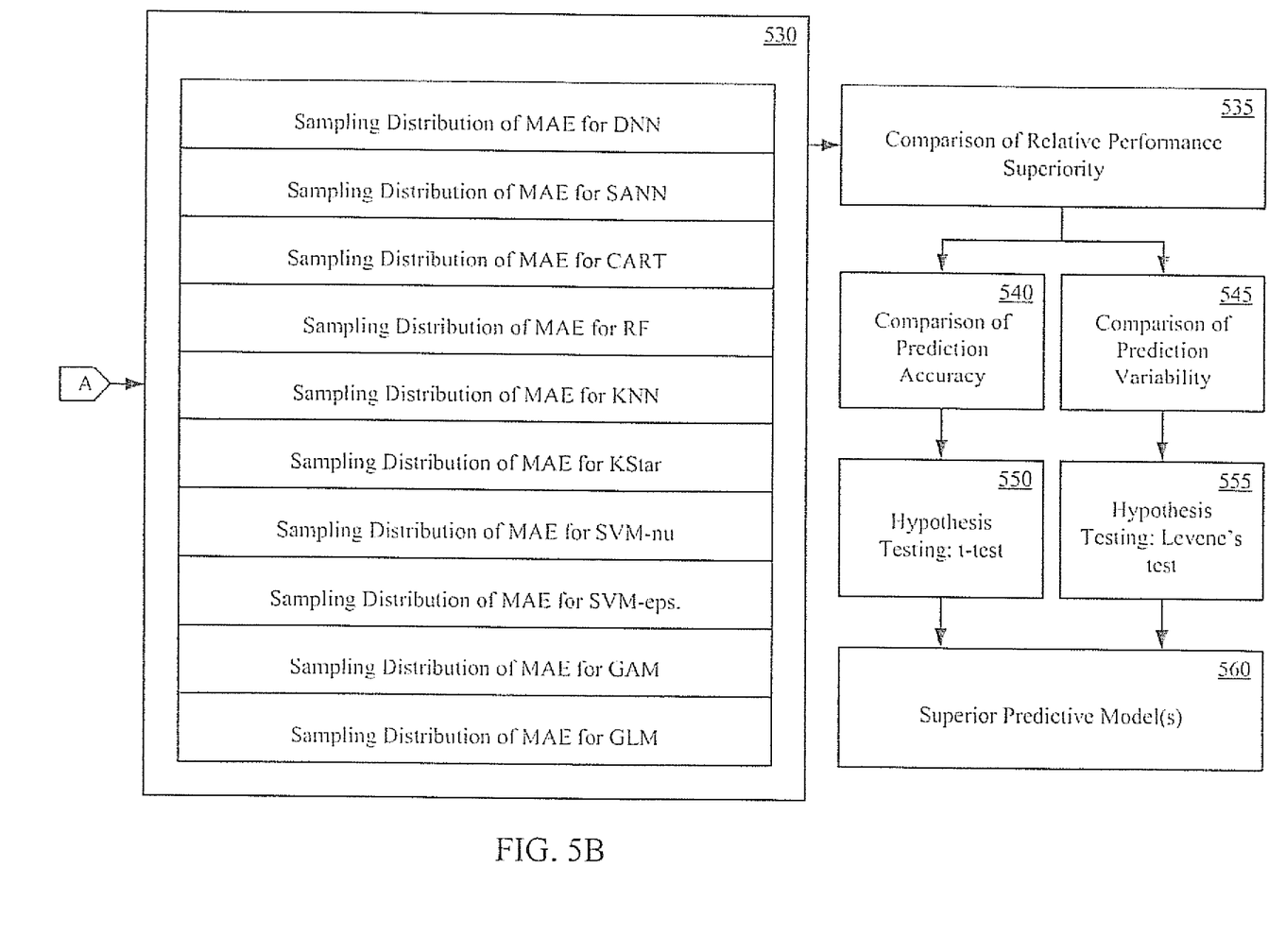

Predictive models are not equally accurate and are not at the same level of robustness and prediction accuracy for drive analytics applications. To find the best model for drive analytics purposes, a brute force approach can be utilized. Referring now to FIGS. 5A and 5B, a prediction robustness analysis algorithm, in accordance with aspects of the present technology, is shown. The most common predictive algorithms can be selected to generate a pool of predictive models 510. The pool can contain several models from different classes of predictive algorithms. From a class of artificial neural nets, a shallow artificial neural net (SANN) and a deep neural net (DNN) can be chosen. From a class of tree-based algorithms, classification and regression tree (CART) and random forest (RF) can be selected. The pool can also contain two lazy models including k-nearest neighbor (KNN) and KStar. A support vector machine (SVM-nu) and an SVM-epsilon support vector machine can also be incorporated. From the class of statistical models, a generalized adaptive model (GAM) and generalized linear model (GLM) can be chosen.

The constructed models 510 can be tested using an original test set 515 and a pool of B bootstrapped test sets 520. The mean absolute error 525, according to Equation 1, can be used to assess prediction performance of predictive models. By applying the original and bootstrapped test sets to the pool of constructed predictive models, associate MAEs can be estimated and sampling distributions of MAE for fuel, safety, behavioral, and the like efficiency metrics can be generated. The generated sampling distributions 530 can be used to assess accuracy and robustness conditions of the associated predictive models. Accuracy of predictive models can be analyzed and compared by performing comparative experiments 535, 540, 545. A two-sample t-test 550 can be utilized to analyze the accuracy condition of the predictive models. The variability of condition of the predictive models can be assessed using Levene's test 555. The total prediction performance of the predictive models can be analyzed, compared and the superior predictive models 560 can be recognized based on the developed statistical inference paradigm. The superior predictive algorithms can be utilized as a prediction agent to perform die Monte Carlo simulation.

Figure 6:
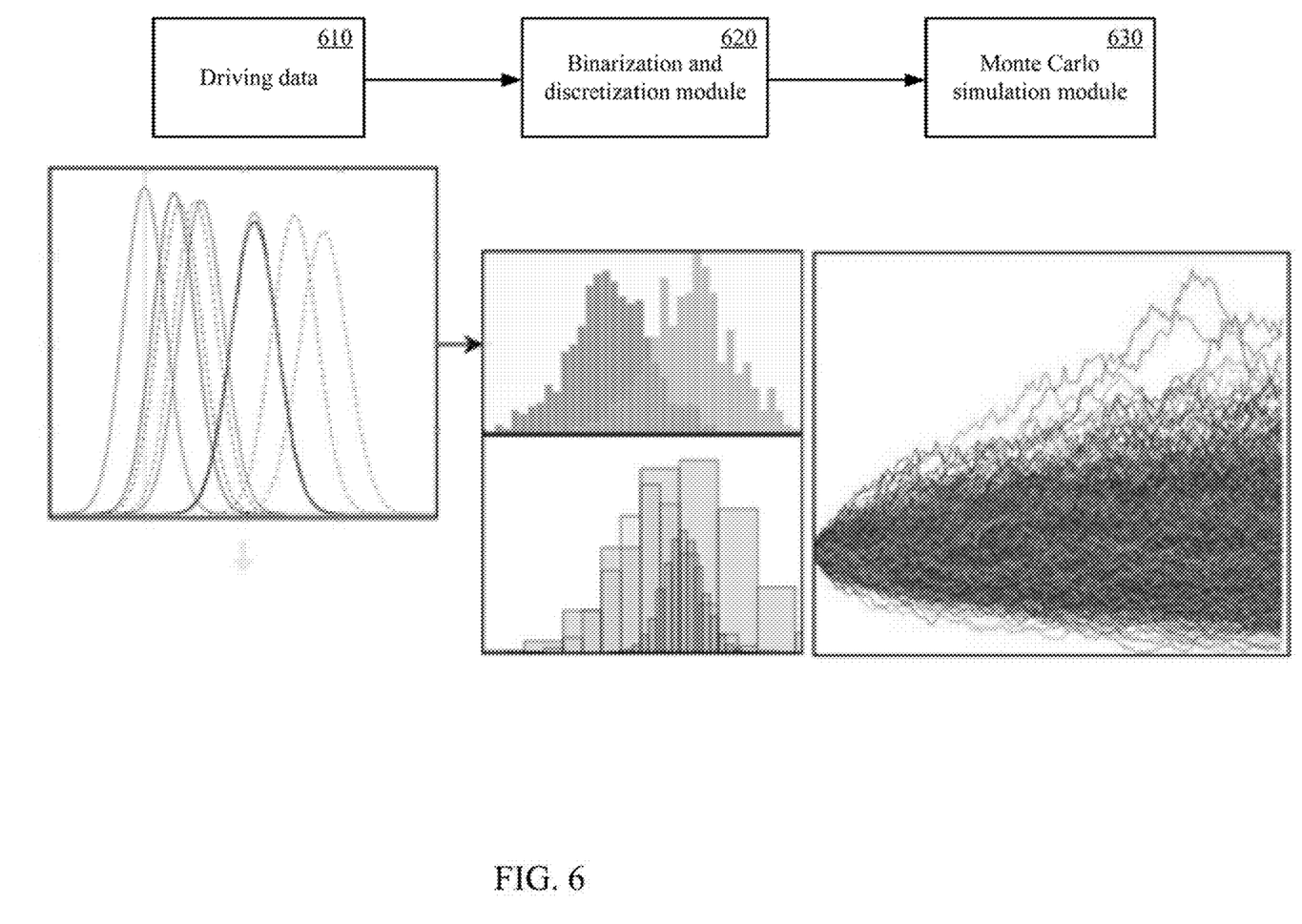
FIG. 6 shows an exemplary Monte Carlo simulation, in accordance with aspects of the present technology.

Referring again to FIG. 1, the Monte Carlo simulation unit 135 can be configured to perform statistical Monte Carlo simulations using the predicted plurality of scenarios and the one or more predictive models. The Monte Carlo simulation unit 135 can be configured to assess a plurality of possible scenarios based on binarized and discretized input data. One or more of a number, a type, and a scope of input features to the Monte Carlo simulation unit can be adjustable. The Monte Carlo simulation unit 135 can apply all possible scenarios, including unseen scenarios, to the predictive models in a brute force manner to predict the possible outputs, such as fuel safety behavior or the like. Referring now to FIG. 6, an exemplary Monte Carlo simulation, in accordance with aspects of the present technology, is illustrated. Admitted driving data 610 can be binarized and discretized 620. The binarized and discretized data can then be analyzed by the Monte Carlo simulation module 630 to assess a plurality of possible scenarios. The binarization and discretization of the driving data advantageously controls the computational costs.

Referring again to FIG. 1, the Monte Carlo simulation unit 130 can be designed to be flexible such that the number, type and scope of the input features can be adjusted. To reduce the computational cost of the Monte Carlo simulation, massively parallel processing platforms, such as CUDA, can be employed. Such integration enables dramatic increases in computing performance by harnessing the power of the graphics processing unit (GPU). Parallel processing in the GPU can allow the Monte Carlo algorithm to perform the nested loop operation in an efficient manner. The Monte Carlo simulation operation can be optimized by using Python's Numba package where nested loops have been evaluated in an accelerated mode.

The events reconstruction, optimization and ranking unit 140 can be configured to reconstruct driving events, evaluate driving scenarios and determine best case or near best case driving scenarios. The events reconstruction, optimization and ranking unit 140 can be configured to receive an observed scenario and associated observed energy efficiency. The events reconstruction, optimization and ranking unit 140 can be configured to determine best and worst possible scenarios and associated best and worst efficiencies that could have happened for the observed scenario based on the Monte Carlo simulation results. The normalized observed energy efficiency can comprise a ranking, score or the like.

In one implementation, a best and worst driver can be determined. The best driver can be a driver who drives each individual driving scenario or driving scenario segment in the most efficient way such that no other driver can surpass the best driver in terms of efficiency. On the other hand, the worst driver can be a driver that performs each driving scenario or driving scenario segment in the most inefficient way such that no other driver can be more inefficient than the worst driver. By employing this rational, the upper and lower boundaries of driver efficiency for comparison purposes have been deployed. Synthesizing or generating these two hypothetical drivers is mathematically feasible and guaranteed in the Monte Carlo simulation as Monte Carlo simulation generates all possible driving scenarios in an exhaustive (i.e., brute force) manner.

Figure 7:
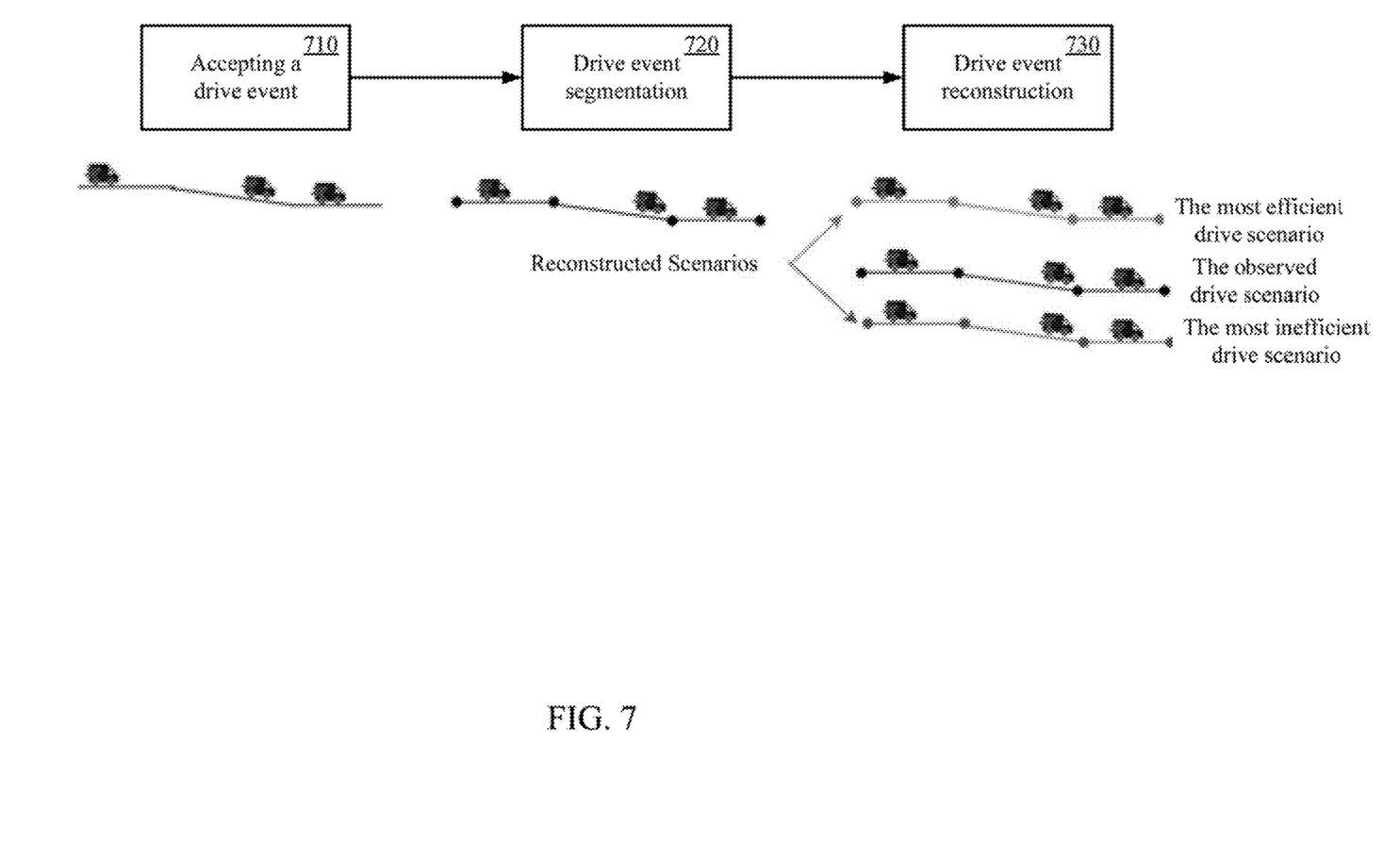
FIG. 7 shows a drive event segmentation and reconstruction, in accordance with aspects of the present technology.

Referring now to FIG. 7, a drive event segmentation and reconstruction, in accordance with aspects of the present technology, is illustrated. The events reconstruction, optimization and ranking unit can be configured to receive an observed scenario 710 and associated observed energy efficiency. The observed scenario can be segmented 720 into smaller sub-events. In one implementation, the segmentation can be done by discretizing the drive event based on equal time windows like Δt=10 sec. The algorithm can query the data and worst possible scenarios and associated best and worst efficiencies can be determined for each segment 730. In one implementation, the best solution can be generated by stitching the best segments resulting from the queries in a greedy manner. The worst solution can be generated by stitching the worst segments.

The observed energy efficiency can be normalized as a function of the best and worst segment energy efficiencies. In one implementations, upon determining the best and worst driving scenarios and associated efficiencies, the given driving scenario can be normalized and ranked with respect to the best and worst boundary scenarios. The normalized ranking can be express in accordance with Equation 2.

$$z = \frac{n_{obs} - n_{worst}}{n_{best} - n_{worst}} \quad (2)$$

where z is the ranking score of the driving or drive event, $n_{obs}$ is the observed efficiency of the given drive or drive event, $n_{best}$ and $n_{worst}$ are efficiencies associated with the best and the worst drivers or drive events. It should be noted that z-score is a continuous variable in the [0,1] interval. However, for categorization purposes, the z-score can also be discretized to categorized the drives or drive scenarios, such as in the following exemplary performance categories: 1) 0≤z<0.25, very poor performance, 2) 0.25≤z<0.50, poor performance, 3) 0.50≤z<0.75, good performance, 4) 0.75≤z<0.90 very good performance, and 5) 0.90≤z≤1.00, excellent performance.

Referring again to FIG. 1, the normalized performance comparison system 100 can further include a causation analytics unit 155. The causation analytics unit 155 can be configured to extract a plurality of driving rules based on one or more of the best or near best driving scenarios determined by the Monte Carlo simulation. The causation analytics unit 155 can also extract additional driving rules based on one or more of the worst or near worst driving scenarios. The normalized performance comparison system 100 can further include a training/assist unit 160. The training/assist unit 160 can be configured to output one or more throttle, brake, and gear indications to a driver based on the one or more driving rules in a coaching mode. Alternatively, the training/assist unit 160 can be configured to modify one or more of a driver throttle input, a driver brake input, a driver gear input and a driver steering based on the one or more driving rules in an assist mode.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated, it is intended that the scope of the invention be defined by the claims appended hereto and their equivalents.

What is claimed is:

1. A system for normalized performance comparison comprising:
   a predictive analytics unit configured to predict a plurality of driving scenarios based on one or more predictive models of operation of a vehicle;
   a Monte Carlo simulation unit configured to perform statistical Monte Carlo simulations using the plurality of predicted driving scenarios and the one or more predictive models of the operation of the vehicle;
   an events reconstruction, optimization, and ranking unit configured to reconstruct driving events of an observed driving scenario, evaluate the observed driving scenario based on the Monte Carlo simulations of the predicted driving scenarios, and determine a best/near best driving scenario based on a ranking of performance for the plurality of predicted driving scenarios; and
   outputting vehicle operation feedback based on the best/near best driving scenario.

2. The system for normalized performance comparison of claim 1, further comprising:
   the events reconstruction, optimization and ranking unit further configured to determine a worst/near worst driving scenario based on the ranking of performance for the plurality of predicted driving scenarios, and rank an observed driving scenario with respect to the determined best/near best and worst/near worst driving scenarios.

3. The system for normalized performance comparison of claim 1, further comprising:
   a causation analytics unit configured to extract a plurality of driving rules based on the best/near best driving scenario.

4. The system for normalized performance comparison of claim 3, further comprising:
   the events reconstruction, optimization and ranking unit further configured to determine a worst/near worst driving scenario based on the ranking of performance for the plurality of predicted driving scenarios; and
   the causation analytics unit configured to extract additional driving rules based on the worst/near worst driving scenario.

5. The system for normalized performance comparison of claim 3, further comprising:
   a training unit configured to determine one or more of the driving rules for a current driving scenario and output the vehicle operation feedback as one or more throttle, brake, and gear indications to a driver of the vehicle based on the one or more driving rules in a coaching mode.

6. The system for normalized performance comparison of claim 3, further comprising:
   a training unit configured to determine one or more of the driving rules for a current driving scenario and to output the vehicle operation feedback by modifying one or more of a driver throttle input, a driver brake input, a driver gear input and a driver steering input to the vehicle based on the one or more driving rules in an assist mode.

7. The system for normalized performance comparison of claim 6, wherein the predictive analytics unit is further configured to:
   binarize and discretize continuous input data;
   select a subset of significant features from a set of available features;
   construct one or more predictive models; and
   analyze the robustness of the plurality of predictive models for accuracy and variability.

8. The system for normalized performance comparison of claim 7, wherein the significant features are selected utilizing one or more feature selection algorithms, a dimensionality reduction algorithm, and a vote-counting algorithm.

9. The system for normalized performance comparison of claim 6, wherein the Monte Carlo simulation unit is configured to assess a plurality of possible scenarios based on binarized and discretized input data.

10. The system for normalized performance comparison of claim 6, wherein one or more of a number, a type, and a scope of input features to the Monte Carlo simulation unit are adjustable.

11. The system for normalized performance comparison of claim 1, further comprising:
   a data logistic unit configured to receive data from one or more data sources;
   a data ingestion unit configured to ingest the data received by the data logistic unit and prepare the data for further analysis;
   a data management unit configured to store, manage, query, and retrieve the data from the data ingestion unit, a data extraction, transformation and loading unit, the Monte Carlo simulation unit and the events reconstruction, optimization and ranking unit; and
   the data extraction, transformation and loading unit configured to extract and mine the data from the data management unit and transform the data to a data structure and format appropriate for the predictive analytics unit.

12. The system for normalized performance comparison of claim 11, further comprising:
   a data governance unit for determining the data received from the one or more data sources conforms with one or more regulations before ingestion by the data ingestion unit.

13. The system for normalized performance comparison of claim 12, wherein the data governance unit is configured to determine the data meets one or more of government regulations, industry regulation, and organization regulation.

14. The system for normalized performance comparison of claim 11, wherein the data logistic unit is configured to:
   cleanse the data;
   unify the data from one or more data sources;
   convert the data to a structured type; and
   compress the data.

15. The system for normalized performance comparison of claim 11, wherein the data management unit is configured to receive queries and return file pointers to a file-residing directory.

16. The system for normalized performance comparison of claim 1, wherein the one or more predictive models include a constructed parametric model.

17. The system for normalized performance comparison of claim 1, wherein the one or more predictive models include a constructed non-parametric model.

18. A method of comparing performance of one or more aspects of ground vehicle operation comprising:
   constructing one or more predictive models of the ground vehicle operation;
   predicting a plurality of ground vehicle operation scenarios;
   determining Monte Carlo simulation results using the predicted plurality of ground vehicle operation scenarios and the one or more predictive models;
   receiving an observed ground vehicle operation scenario and associated observed efficiency of the ground vehicle operation;
   determining a best possible scenario and associated best efficiency that could have happened for the observed ground vehicle operation scenario based on a ranking of the Monte Carlo simulation results;
   determining a worst possible scenario and associated worst efficiency that could ave happened for the observed ground vehicle operation scenario based on the Monte Carlo simulation results; and
   outputting vehicle operation feedback based on the determined best possible scenario and the determined worst possible scenario.

19. The method of comparing performance of one or more aspects of ground vehicle operation according to claim 18, wherein the one or more predictive models includes one or more models selected from a group comprising one or more parametric models and one or more non-parametric models.

20. The method of comparing performance of one or more aspects of ground vehicle operation according to claim 18, further comprising:
   selecting a set of significant features of the ground vehicle operation; and
   construction the one or more predictive models based on the set of significant features.

21. The method of comparing performance of one or more aspects of ground vehicle operation according to claim 18, further comprising:
   segmenting the received observed scenario;
   determining a best possible segmented scenario and associated best segmented efficiency that could have happened for each segment of the observed ground vehicle operation scenario based on the Monte Carlo simulation results;
   determining a worst possible segmented scenario and associated worst segmented efficiency that could have happened for each segment of the observed ground vehicle operation scenario based on the Monte Carlo simulation results; and
   outputting vehicle operation feedback based on the determined best possible segmented scenario and the determined worst possible segmented scenario for each segment.

22. The method of comparing performance of one or more aspects of ground vehicle operation according to claim 18, further comprising:
   binarizing and discretizing continuous input data of the plurality of scenarios.

23. The method of comparing performance of one or more aspects of ground vehicle operation according to claim 22, wherein the input data includes one or more of road data, environmental data, traffic data, ground vehicle data and driver data.

24. The method of comparing performance of one or more aspects of ground vehicle operation according to claim 23, further comprising:
   determining that the input data conforms with one or more regulations before ingestion by the data ingestion unit.

25. The method of comparing performance of one or more aspects of ground vehicle operation according to claim 18, wherein the efficiency comprises a ground vehicle energy efficiency.

* * * * *